US012107317B2

(12) United States Patent
Severin et al.

(10) Patent No.: US 12,107,317 B2
(45) Date of Patent: Oct. 1, 2024

(54) UNIVERSAL SMALL CELL ANTENNA MOUNTS AND ANTENNA MOUNT ASSEMBLIES

(71) Applicant: Outdoor Wireless Networks LLC, Claremont, NC (US)

(72) Inventors: Matthew Severin, Grapevine, TX (US); Dale R. Heath, Forth Worth, TX (US); Jacob L. Adams, The Colony, TX (US); Michael Carnes, Euless, TX (US); Brian D. Cross, Double Oak, TX (US); Jared D. Haines, Rock City Falls, NY (US); Eric Sarellana, Euless, TX (US)

(73) Assignee: Outdoor Wireless Networks LLC, Claremont, NC (US)

(*) Notice: Subject to any disclaimer, the term of this patent is extended or adjusted under 35 U.S.C. 154(b) by 0 days.

(21) Appl. No.: 18/326,169

(22) Filed: May 31, 2023

(65) Prior Publication Data

US 2023/0318162 A1 Oct. 5, 2023

Related U.S. Application Data

(63) Continuation of application No. 17/224,668, filed on Apr. 7, 2021, now Pat. No. 11,705,616.

(60) Provisional application No. 63/043,452, filed on Jun. 24, 2020.

(51) Int. Cl.

| | |
|---|---|
| ***H01Q 1/12*** | (2006.01) |
| ***H01Q 1/20*** | (2006.01) |
| ***H01Q 1/24*** | (2006.01) |

(52) U.S. Cl.
CPC ............ *H01Q 1/1228* (2013.01); *H01Q 1/20* (2013.01); *H01Q 1/246* (2013.01)

(58) Field of Classification Search
CPC ......... H01Q 1/2228; H01Q 1/20; H01Q 1/246
See application file for complete search history.

(56) References Cited

U.S. PATENT DOCUMENTS

| | | | | |
|---|---|---|---|---|
| 2020/0106169 | A1* | 4/2020 | Ahmed | H01Q 1/36 |
| 2020/0388902 | A1 | 12/2020 | Colapietro et al. | |
| 2021/0104807 | A1* | 4/2021 | Patel | H01Q 1/1207 |
| 2021/0384608 | A1* | 12/2021 | Lockwood | H01Q 1/22 |

* cited by examiner

*Primary Examiner* — Graham P Smith
*Assistant Examiner* — Amal Patel
(74) *Attorney, Agent, or Firm* — Myers Bigel, P.A.

(57) ABSTRACT

The present disclosure describes an antenna mount. The antenna mount includes a base plate having a plurality of mounting apertures and includes a plurality of arm sections extending radially outwardly therefrom, each arm section having an elongated slot, a plurality of fasteners, each fastener configured to slide within a respective slot, a pole top mount secured to the base plate via the plurality of mounting apertures, and a plurality of brackets, each bracket secured to the base plate by a respective fastener extending through each slot. The position of the brackets is adjustable relative to the base plate by sliding the fasteners within each slot, thereby allowing the antenna mount to be secured to different diameter mounting structures. Antenna mount assemblies are also described herein.

18 Claims, 13 Drawing Sheets

UNIVERSAL SMALL CELL ANTENNA MOUNTS AND ANTENNA MOUNT ASSEMBLIES

RELATED APPLICATION(S)

This application is a continuation of U.S. patent application Ser. No. 17/224,668, filed Apr. 7, 2021, which claims priority to and the benefit of U.S. Provisional Application Ser. No. 63/043,452, filed Jun. 24, 2020, the disclosures of which are hereby incorporated herein in their entireties.

FIELD

The present application is directed generally toward telecommunications equipment, and more particularly, small cell antenna mounts and antenna mount assemblies.

BACKGROUND

Typically, utility poles have pre-drilled hole patterns that may be used for mounting telecommunications equipment. In many instances, the pre-drilled holes are not located on top of the pole, but instead are located on the sides of the utility pole adjacent to the top of the pole. The distance of these pre-drilled holes from the top of the utility pole may vary from pole to pole. In addition, there are different sizes (e.g., diameters) of utility poles. Therefore, an installer must match the proper antenna mount based on the pre-drilled hole pattern and/or size of the utility pole. There may be a desire for a universal antenna mount capable of being mounted on different utility poles having varying pre-drilled hole patterns and/or sizes, while also complying with wind load standards.

SUMMARY

A first aspect of the present invention is directed to an antenna mount. The antenna mount includes a base plate having a plurality of mounting apertures and includes a plurality of arm sections extending radially outwardly therefrom, each arm section having an elongated slot, a plurality of fasteners, each fastener configured to slide within a respective slot, a pole top mount secured to the base plate via the plurality of mounting apertures, and a plurality of brackets, each bracket secured to the base plate by a respective fastener extending through each slot. The position of the brackets is adjustable relative to the base plate by sliding the fasteners within each slot, thereby allowing the antenna mount to be secured to different diameter mounting structures.

Another aspect of the present invention is directed to an antenna mount assembly. The antenna mount assembly includes a mounting structure having a diameter and comprising a pre-drilled hole pattern, a plurality of small cell antennas, and an antenna mount. The antenna mount includes a base plate having a plurality of mounting apertures and includes a plurality of arm sections extending radially outwardly therefrom, each arm section having an elongated slot, a plurality of fasteners, each fastener configured to slide within a respective slot, a pole top mount secured to the base plate via the plurality of mounting apertures with at least one of the plurality of small cell antennas mounted on the pole top mount, and a plurality of brackets, each bracket secured to the base plate by a respective fastener extending through each slot. The position of the brackets is adjustable relative to the base plate by sliding the fasteners within each slot, thereby allowing the antenna mount to be secured to the mounting structure, and the antenna mount assembly is capable of withstanding a wind load of at least 150 mph.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
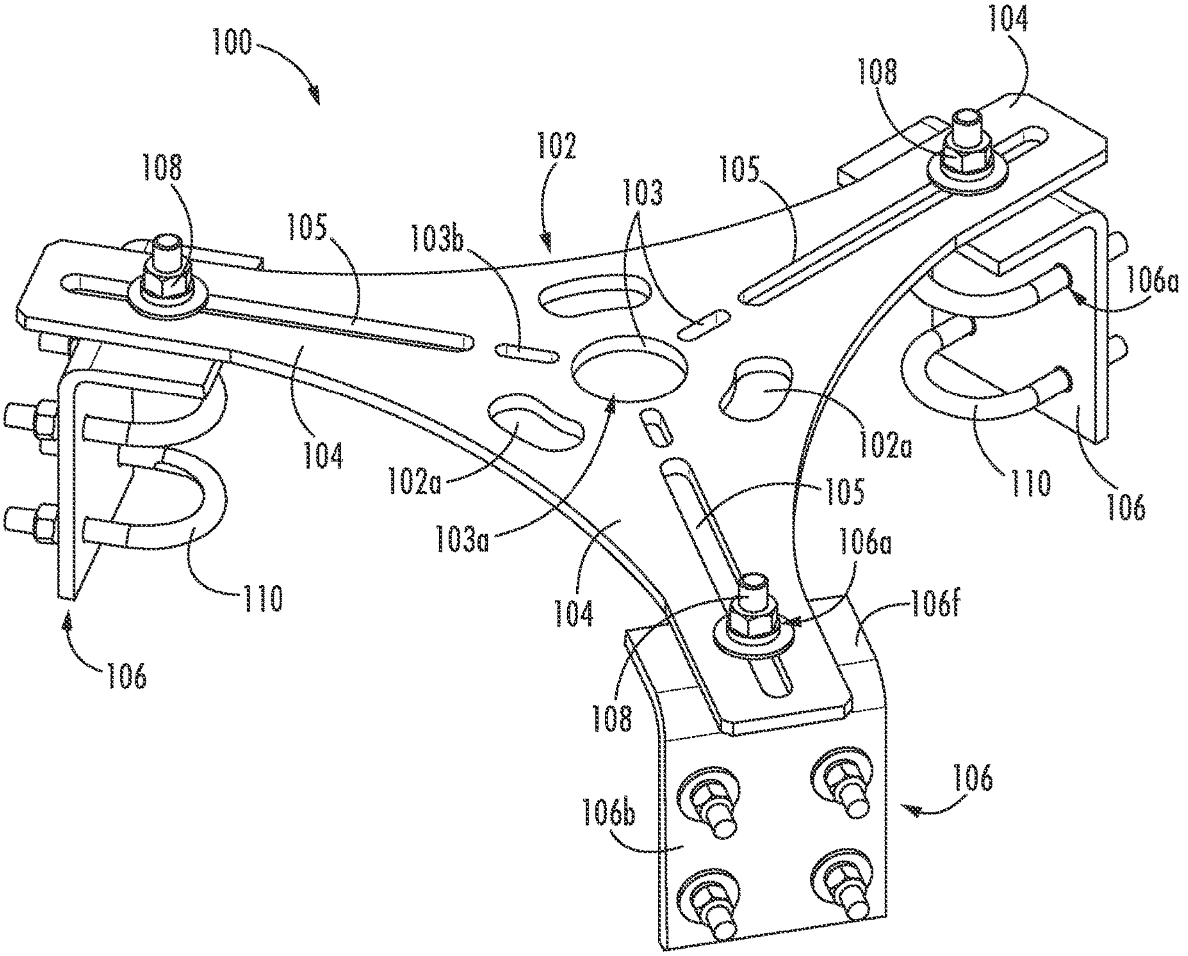
FIG. 1 is a perspective view of an antenna mount according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10'', 10''').

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Pursuant to embodiments of the present invention, universal small cell antenna mounts are provided that may be mounted to different sized mounting poles (e.g., utility poles) having different pre-drilled hole patterns and that may also have the capability to withstand a wind load of at least 150 mph. Antenna mount assemblies are also provided herein. Embodiments of the present invention will now be discussed in greater detail with reference to FIGS. 1-7B.

Referring now to the drawings, an antenna mount 100 according to embodiments of the present invention is illustrated in FIG. 1. As shown in FIG. 1, the antenna mount 100 includes a base plate 102. The base plate 102 has a plurality of integral arm sections 104 that extend radially outwardly therefrom. For example, in some embodiments, the base plate 102 may comprise three arm sections 104 extending radially outward and spaced approximately 120 degrees apart from each other (i.e., forming a base plate 102 having a generally triangular shape).

Each arm section 104 of the base plate 102 comprises a slot 105 configured to receive a fastener 108. Each slot 105 may extend a majority of the length of the arm section 104 and is configured such that the fastener 108 can slide within the slot 105. In some embodiments, the fasteners 108 are a plurality of nuts and bolts.

The base plate 102 further includes one or more apertures 103. In some embodiments, the apertures 103 may comprise a circular opening 103*a* and/or one or more elongated openings (or slots) 103*b*. For example, as shown in FIG. 1, in some embodiments, the apertures 103 may comprise a circular opening 103*a* residing generally in the center of the base plate 102 (i.e., relative to the arm sections 104) and one or more slots 103*b* extending radially outward from the circular opening 103*a* (i.e., towards a corresponding arm section 104). In some embodiments, the base plate 102 may comprise three slots 103*b* spaced approximately 120 degrees apart around the circular opening 103*a*. In some embodiments, each slot 103*b* may be aligned with the slot 105 of a respective arm section 104. In some embodiments, the slots (or mounting apertures) 103*b* are configured such that an antenna 120 may be secured to the antenna mount 100 (see, e.g., FIG. 2).

The base plate 102 of the antenna mount 100 may further include a plurality of cable routing apertures 102*a*. In some embodiments, the cable routing apertures 102*a* may reside circumferentially around the circular opening 103*a* (e.g., between each radially extending slot 103*b*). In some embodiments, the cable routing apertures 102*a* are sized and configured to receive cables (not shown) connected to and extending from the bottom of an antenna 120 mounted (or secured) to the antenna mount 100 (see, e.g., FIG. 2) such that the cables may be routed from the antenna 120 through the cable routing apertures 102*a* to a mounting structure 150 (e.g., utility pole). In some embodiments, the circular opening 103*a* may also be used to route cables connected to the bottom of the antenna 120.

Still referring to FIG. 1, the antenna mount 100 further includes a plurality of brackets 106. In some embodiments, each bracket 106 has a main body 106*b* with a portion of the main body 106*b* bent approximately 90 degrees (i.e., perpendicular to the main body 106*b*) to form a flanged end 106*f*. In some embodiments, the flanged end 106*f* of the bracket 106 comprises an aperture 106*a* sized and configured to receive a respective fastener 108. Each bracket 106 may be secured to the base plate 102 (i.e., a respective arm section 104 of the base plate 102) via the fasteners 108 extending through the slots 105. As discussed in further detail below, the position of each bracket 106 is adjustable (i.e., when secured to the base plate 102) by sliding the fastener 108 within the corresponding slot 105, thereby allowing the antenna mount 100 to be secured to different sized (e.g., diameter) mounting structures 150.

In some embodiments, the main body 106*b* of each bracket 106 may comprise one or more additional apertures 106*a*. The apertures 106*a* in the main body 106*b* of each bracket 106 may be sized and configured to receive one or more mounting fasteners 110. The mounting fasteners 110 may be used to help secure the antenna mount 100 to a mounting structure 150. For example, in some embodiments, the mounting fasteners 110 may be U-bolts that are configured to secure the antenna mount 100 to a mounting pole 140 which may be secured to a ring mount 130 that is configured to that secure an antenna mount assembly 200 to a mounting structure 150 (see, e.g., FIG. 2 and FIGS. 7A-7B).

Figure 2:
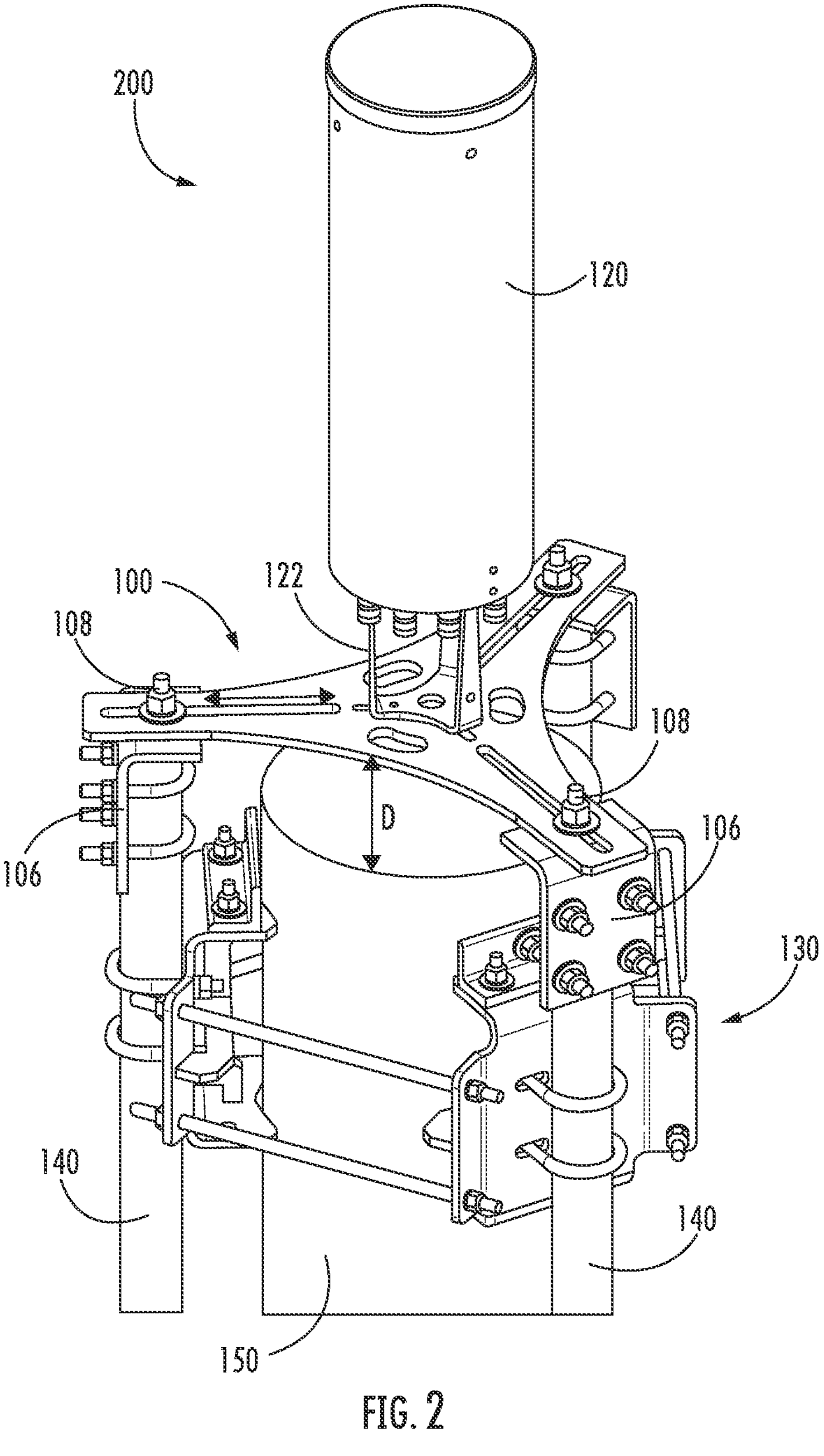
FIG. 2 is a perspective view of an antenna mount assembly according to embodiments of the present invention utilizing the antenna mount of FIG. 1.

Referring to FIG. 2, an antenna mount assembly 200 according to embodiments of the present invention and that may utilize the antenna mount 100 described herein is illustrated. As shown in FIG. 2, the antenna mount 100 is secured to a mounting structure 150 (e.g., a utility pole) via a plurality of mounting poles 140 and a ring mount 130 (see also, e.g., FIGS. 7A-7B). The mounting structure 150 may be a wooden, concrete, steel, or other pole. In some embodiments, the mounting structure 150 may have pre-drilled holes 152 (see, e.g., FIG. 7B).

Each mounting pole 140 may be secured to a respective bracket 106 via one or more mounting fasteners 110 (e.g., U-bolts). To secure the antenna mount 100 to the mounting structure 150, each bracket 106 is loosely secured to the base plate 102 with the fasteners 108. The brackets 106 may then be slid radially inwardly (i.e., via the fasteners 108 sliding within slots 105) until the mounting poles 140 are positioned to be secured to the ring mount 130. The fasteners 108 are tightened to secure the position of the brackets 106 on the base plate 102. Thus, the antenna mount 100 may be secured to different sized (i.e., diameter) mounting structures 150. As shown in FIG. 2, once positioned on the ring mount 130, the mounting poles 140 may be adjusted to position the antenna mount 100 a distance (D) above the top of the mounting structure 150. Once at the desired distance (D) above the top of the mounting structure 150, the mounting poles 150 may be secured in place, thereby locking the antenna mount 100 in the desired position on the mounting structure 150.

Figure 4A:
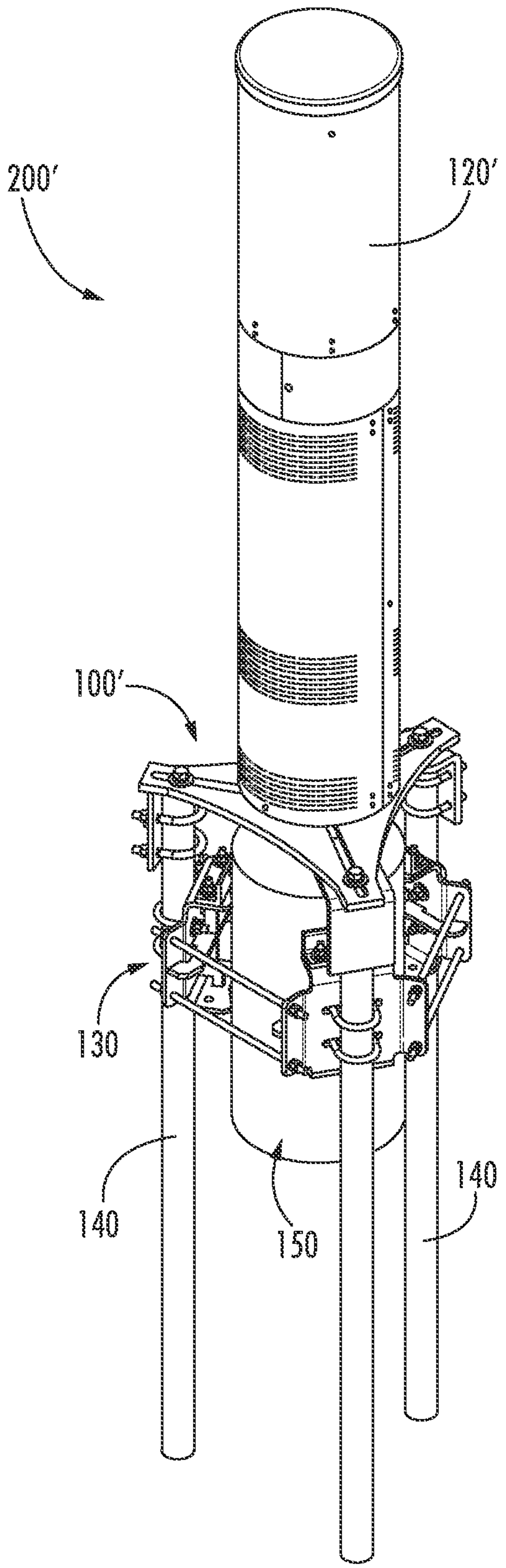
FIG. 4A is a perspective view of an antenna mount assembly according to embodiments of the present invention utilizing the antenna mount of FIGS. 3A-3C.
Figure 6A:
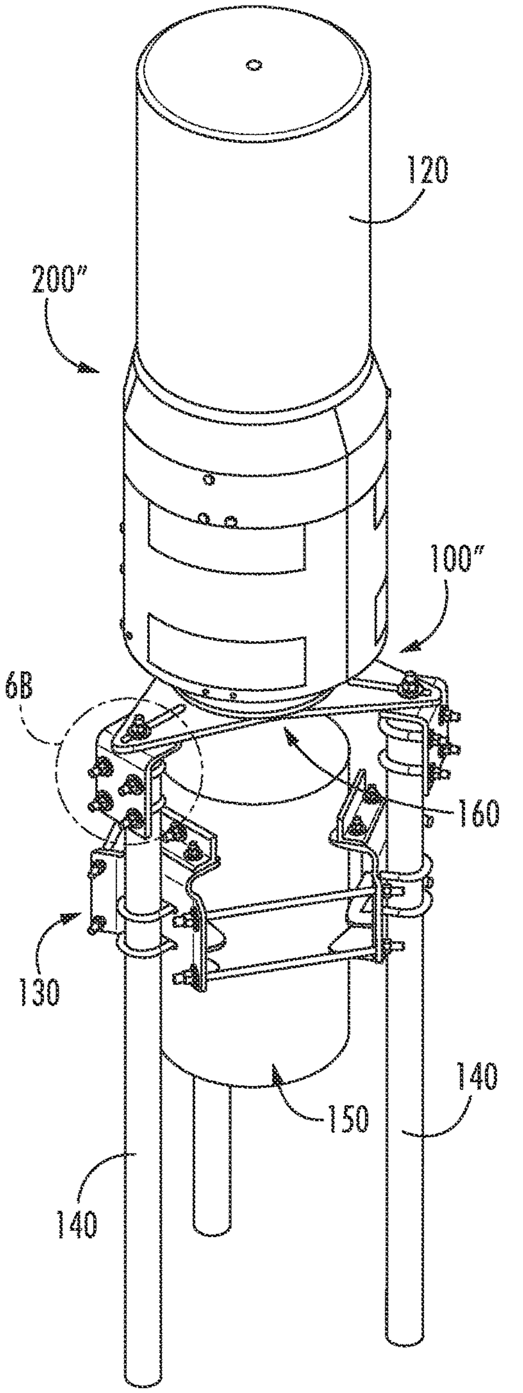
FIG. 6A is a perspective view of an antenna mount assembly according to embodiments of the present invention utilizing the antenna mount of FIGS. 5A-5D.
Figure 7A:
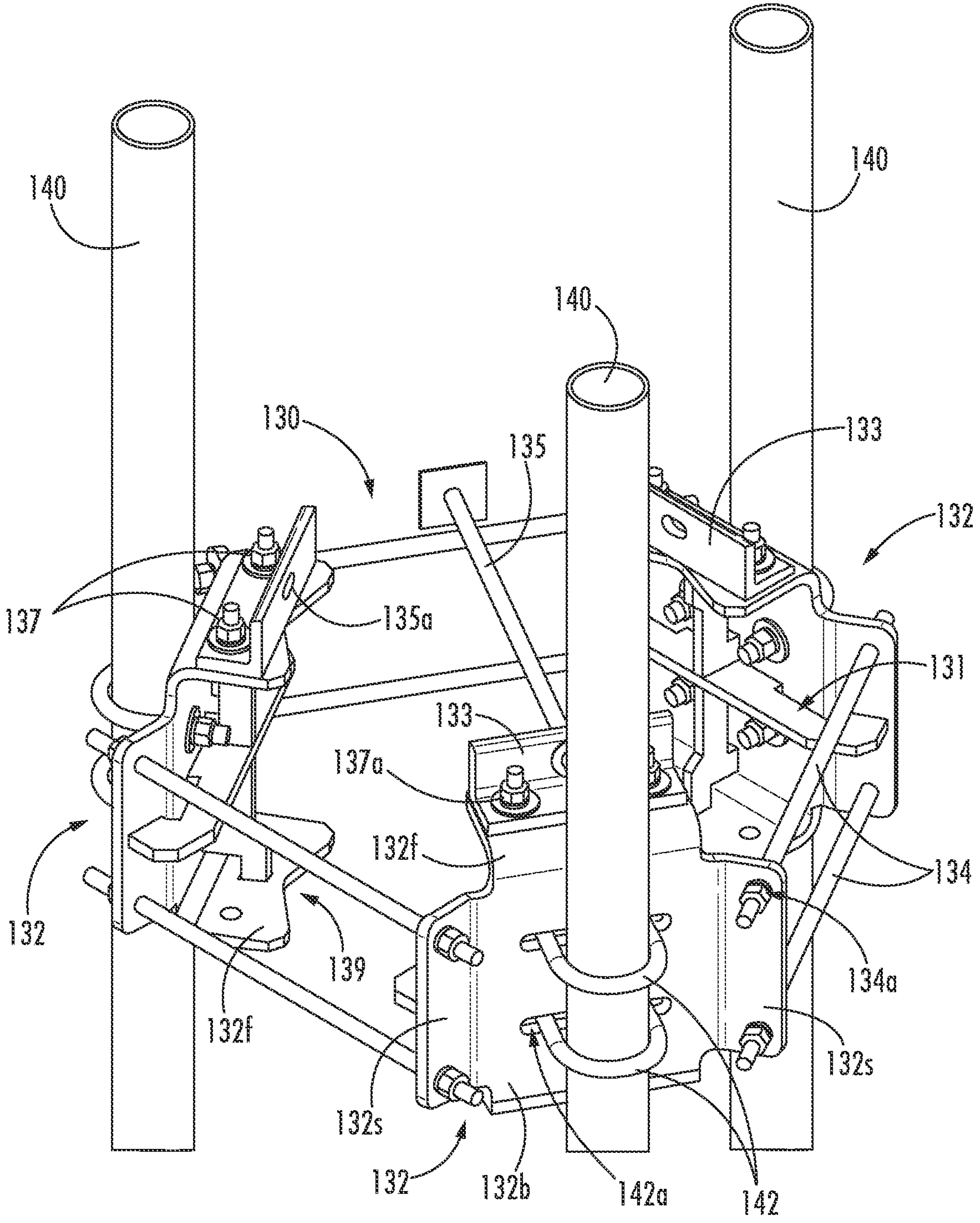
FIG. 7A is a perspective view of a ring mount according to embodiments of the present invention.
Figure 7B:
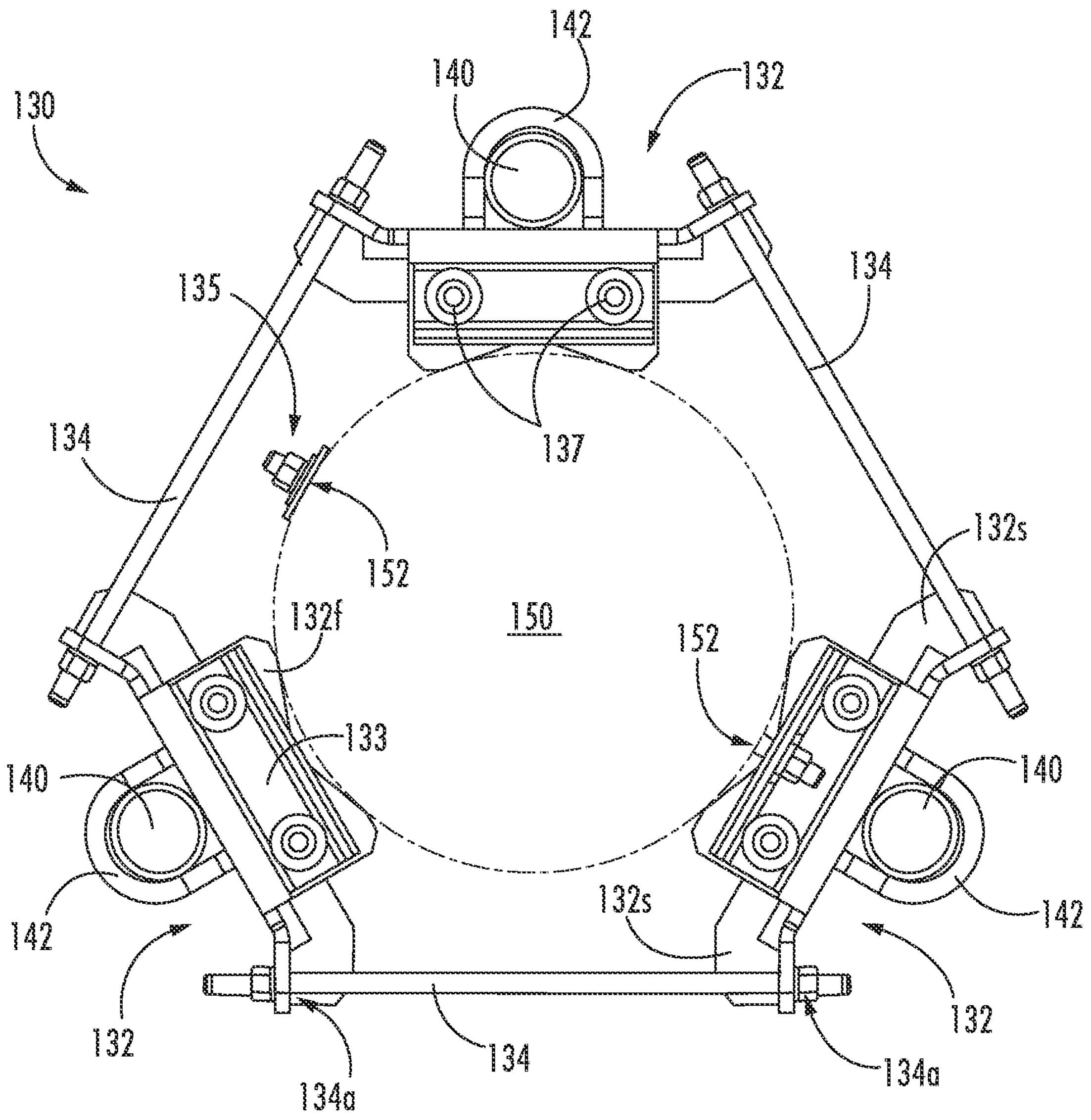
FIG. 7B is a top view of the ring mount of FIG. 7A.

An exemplary ring mount 130 that may be used with the antenna mount assembly 200 is illustrated in FIGS. 7A-7B (see also, e.g., FIGS. 2, 4A, and 6A). As shown in FIGS. 7A-7B, the ring mount 130 may include a plurality of mount brackets 132. For example, in some embodiments, the ring mount 130 may comprise three mount brackets 132. Each mount bracket 132 has a main body 132*b*. The main body 132*b* of each mount bracket 132 has one or more apertures 142*a* configured to receive a mounting pole fastener 142. The mounting pole fastener 142 is sized and configured to secure a mounting pole 140 to a respective mount bracket 132 of the ring mount 130. For example, as shown in FIG. 7A, in some embodiments, the mounting pole fastener 142 is a U-bolt.

In some embodiments, opposing sides of main body 132*b* of the mount bracket 132 may be bent outwardly less than 90 degrees to form side flanges 132*s*. Each side flange 132*s* may comprise one or more apertures 134*a* that are each configured to receive a securing rod 134. In some embodiments, the other opposing sides of the main body 132*b* of the mount bracket 132 may be bent inwardly approximately 90 degrees (i.e., perpendicular to the main body 106*b*) to form end flanges 132*f*. The end flanges 132*f* provide the contact surface of the ring mount 130 configured to engage an outer surface of the mounting structure 150. For example, in some embodiments, each end flange 132*f* may comprise a recess (or concave inner surface) 139 configured to engage the outer surface of the mounting structure 150. The recess 139 provides a larger contact area between the mount brackets 132 and the mounting structure 150, for example, when the mounting structure 150 is cylindrical in shape (i.e., a utility pole).

In some embodiment, the ring mount 130 further includes an extension bracket 133 secured to each mount bracket 132. Each extension bracket 133 may be secured to a respective end flange 132*f* of the mount brackets 132 by fasteners 137 received through apertures 137*a*. Each extension bracket 133 may further comprise a mounting structure aperture 135*a* configured to receive a bolt 135 or other fastener that may be used to further secure the ring mount 130 to the mounting structure 150.

As discussed above, many utility poles 150 have pre-drilled hole patterns 152 that may be used for mounting telecommunications equipment. These pre-drill holes 152 may not be on located on top of the pole 150, but instead may be located on the sides of the utility pole 150 and the distance of these pre-drilled holes 152 from the top of the utility pole 150 may vary from pole to pole. The antenna mount assembly 200 of the present invention allows a ring mount 130 to be mounted first to the utility pole 150 via the pre-drilled holes 152 (regardless of the distance from the top of the pole 150). As shown in FIGS. 7A-7B, a through bolt 135 may be inserted through a pre-drilled hole 152, thereby securing one of the mount brackets 132 to the utility pole 150. For example, in some embodiments, if the mounting structure 150 comprises one or more pre-drilled holes 152, then a through bolt 135 may be inserted through one of the pre-drilled holes 152 and secured to one of the extension brackets 133 (and corresponding mount bracket 132) to the mounting structure 150 (see, e.g., FIG. 7B). The remaining mount brackets 132 may then be positioned around the utility pole 150 and adjacent mount brackets 132 are coupled together by the securing rods 134. The securing rods 134 are tightened to compress the mount brackets 132 against the utility pole 150. Thus, the ring mount 130 is secured to the utility pole 150 by the through bolt 135 while also providing a compressive mounting force against the utility pole 150. If the mounting structure 150 does not comprise pre-drilled holes 152, then three fastener screws (not shown) may be used to secure each extension bracket 133 (and corresponding mount brackets 132) to the mounting structure 150 after the securing rods 134 have been tightened.

After the ring mount 130 has been secured to the mounting structure 150, the antenna mount 100 of the present invention may then be secured to the ring mount 130 by sliding the brackets 106 (and mounting poles 140) radially inward until the mounting poles 140 are positioned to be secured to the ring mount 130, for example, via mounting pole fasteners 142. The mounting poles 140 may then be adjusted such that the antenna mount 100 is positioned at the desired distance (D) above the top of the pole 150. Positioning the antenna mount 100 above the top of the pole 150 provides sufficient space below the antenna 120 such that cables (not shown) may be connected to and routed from the antenna 120 (e.g., without compromising the minimum bend radius of the cables).

Once the antenna mount 100 is secured to the mounting structure 150, an antenna 120 may then be mounted and secured to the antenna mount 100. In some embodiments, the antenna 120 is a small cell antenna. For example, in some embodiments, the antenna 120 is a metrocell antenna. In some embodiments, the antenna 120 may be secured to the antenna mount 100 via an antenna mount adapter 122.

The antenna mount adapter 122 may provide for additional space between the bottom of the antenna 120 and the antenna mount 100 such that cables (not shown) may be connected to and routed from the bottom of the antenna 120. In some embodiments, additional antennas 120 may be secured to the mounting poles 140. For example, in some embodiments, one or more 5G small cell antennas may be mounted to the mounting poles 140 (i.e., below the antenna mount 100). Thus, the antenna mount assembly 200 allows for different types of antennas 120 to be mounted on the same mounting structure 150.

Figure 3A:
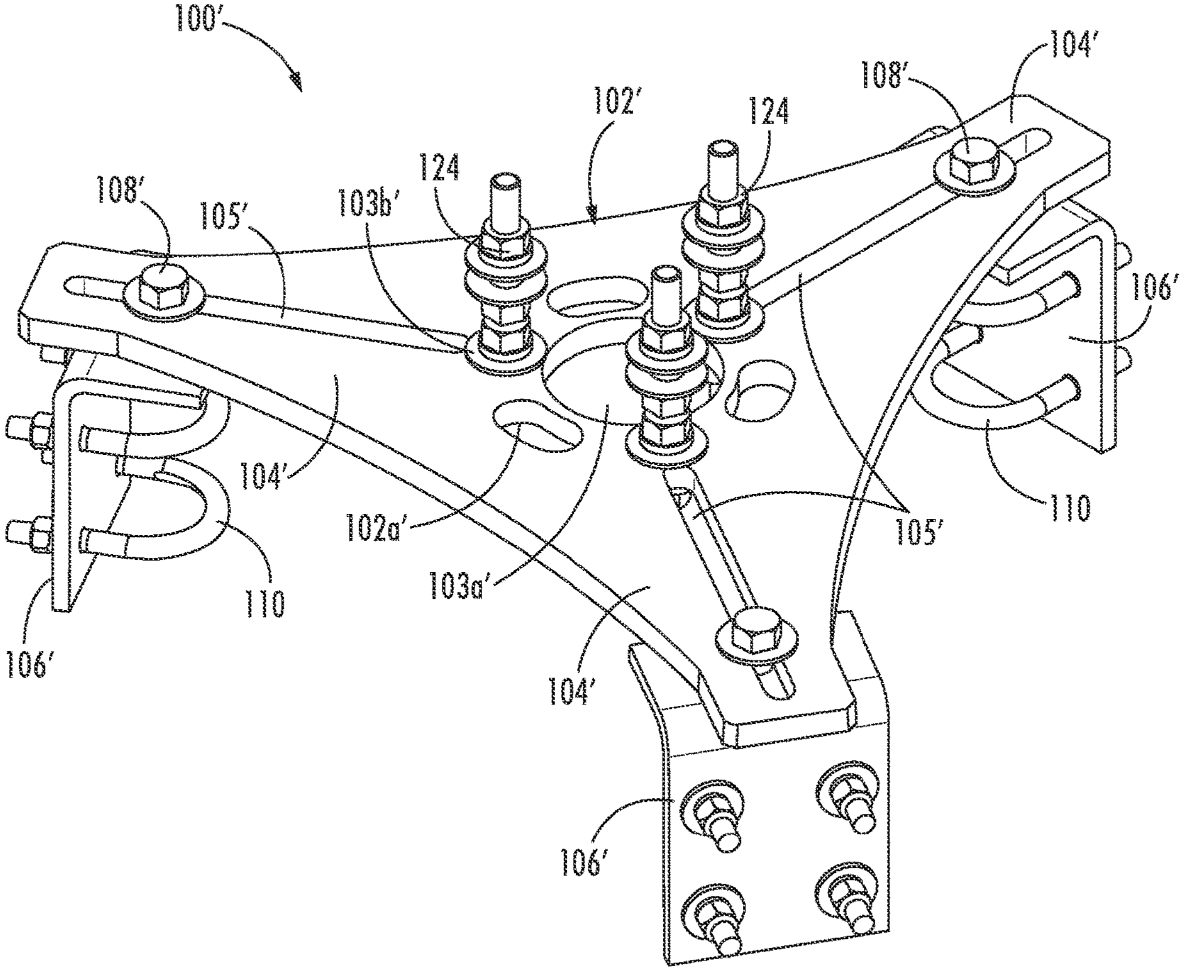
FIG. 3A is a perspective view of an antenna mount according to embodiments of the present invention.
Figure 3B:
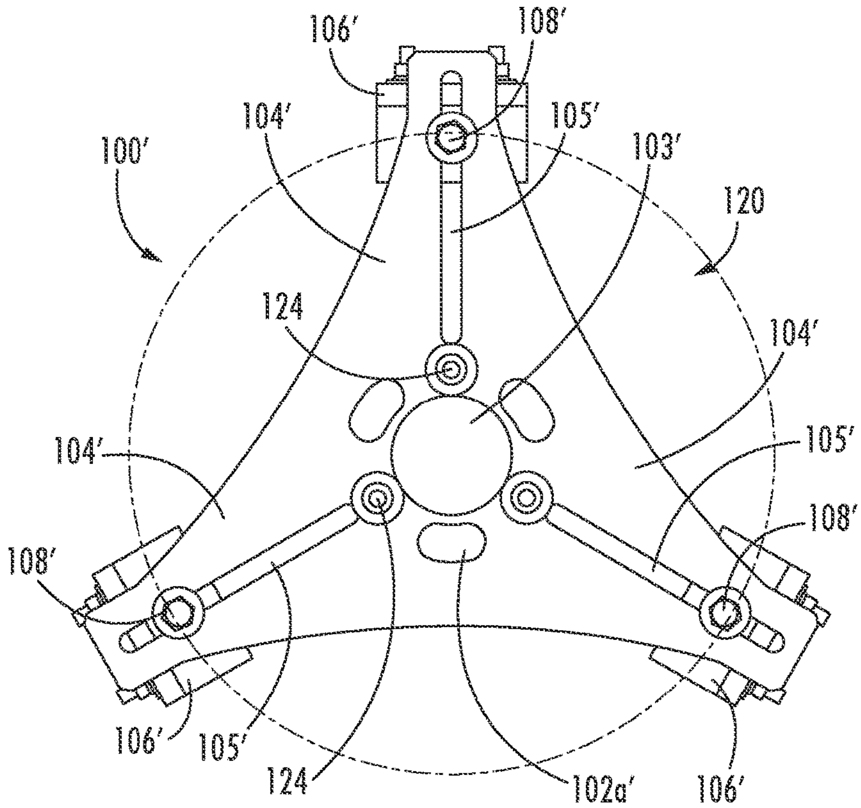
FIG. 3B is a top view of the antenna mount of FIG. 3A.
Figure 3C:
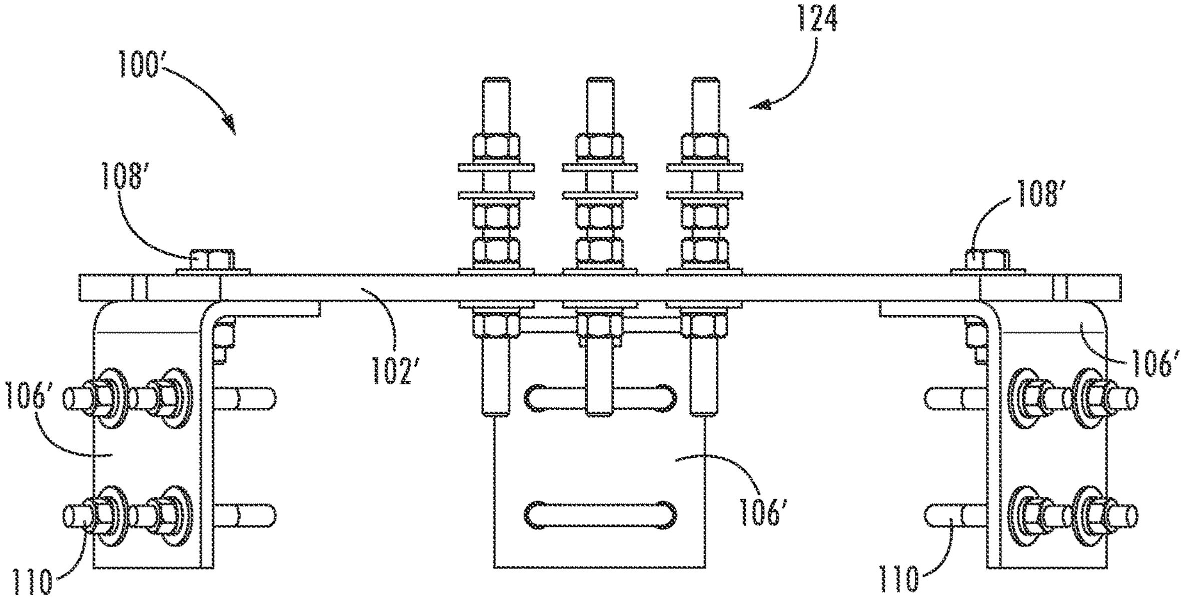
FIG. 3C is a side view of the antenna mount of FIG. 3A.

Referring now to FIGS. 3A-3C, an alternative antenna mount 100' according to embodiments of the present invention is illustrated. The antenna mount 100' is similar to the antenna mount 100 described herein. Thus, properties and/or features of the antenna mount 100' may be described above in reference to FIG. 1, and duplicate discussion thereof may be omitted herein for purposes of discussing FIGS. 3A-3C.

As shown in FIGS. 3A-3C, the antenna mount 100' includes a base plate 102' having a plurality of arm sections 104' with corresponding slots 105 and a plurality of brackets 106' slidably secured to the base plate 102' via fasteners 108'. The antenna mount 100' differs from the antenna mount 100 in that the slotted mounting apertures **103*b* of antenna mount 100 are replaced with circular mounting apertures 103*b*' configured to received antenna mounting fasteners 124. The antenna mounting fasteners 124 may be used to secure an antenna 120' directly to the base plate 102' of the antenna mount 100' (i.e., without using an antenna mount adapter 122 described above) (see also, e.g., FIGS. 4A-4D). In some embodiments, the antenna mounting fasteners 124** may comprise a plurality of bolts, nuts, and washers.

Figure 4B:
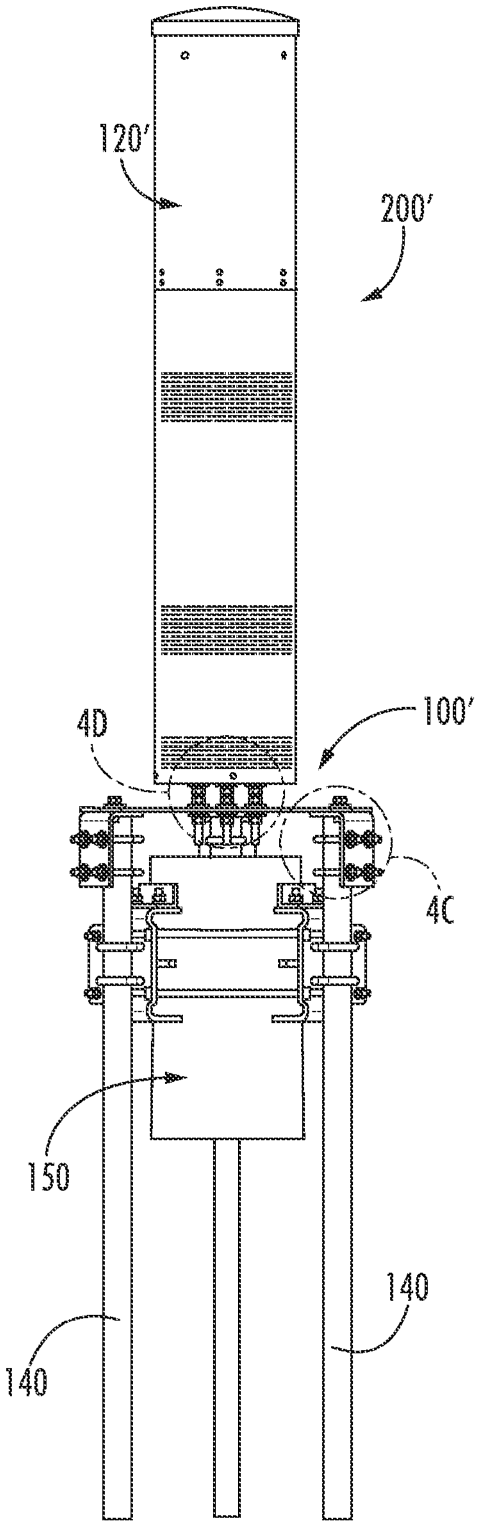
FIG. 4B is a side view of the antenna mount assembly of FIG. 4A.
Figure 4C:
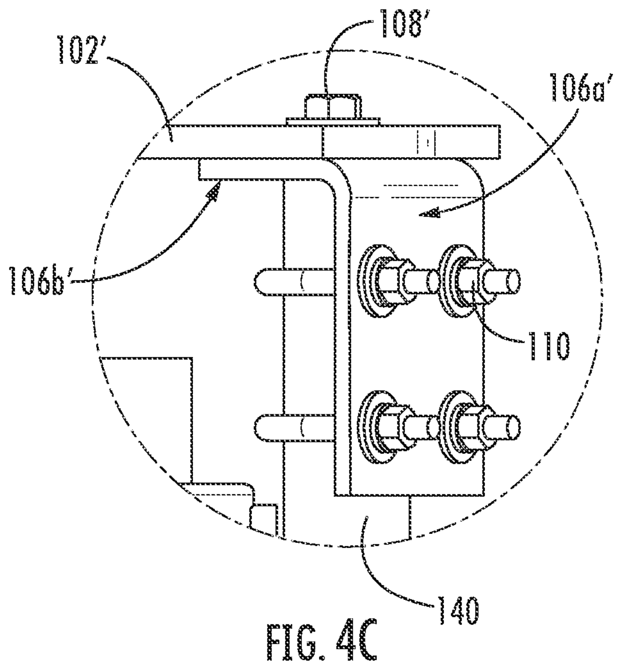
FIG. 4C is an enlarged view of the circled section of the antenna mount assembly of FIG. 4B labeled 4C.
Figure 4D:
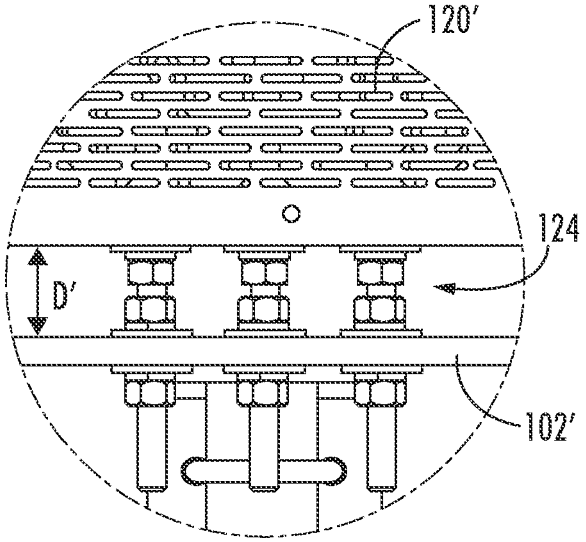
FIG. 4D is an enlarged view of the circled section of the antenna mount assembly of FIG. 4B labeled 4D.

Referring now to FIGS. 4A-4D, an antenna mount assembly 200' according to embodiments of the present invention and that may utilize the antenna mount 100' described herein is illustrated. As shown in FIGS. 4A-4B, in the antenna mount assembly 200', the antenna mount 100' is secured to a mounting structure 150 (e.g., a utility pole) in the same manner as the antenna mount 100 (i.e., via mounting poles 140 and a ring mount 130) (see also, e.g., FIGS. 7A-7B). The antenna mount assembly 200' differs from the antenna mount assembly 200 in the manner in which an antenna 120' is secured to the antenna mount 100', i.e., via the antenna mounting fasteners 124 rather than an antenna mount adapter 122. As shown in FIG. 4B and FIG. 4D, similar to the antenna mount adapter 122, the antenna mounting fasteners 124 position and secure the antenna 120' a distance (D') above the base plate 102' of the antenna mount 100', thereby allowing cables (not shown) to be connected to and routed from the bottom of the antenna 120'.

Referring now to FIGS. 5A-5D, an alternative antenna mount 100" according to embodiments of the present invention is illustrated. The antenna mount 100" is similar to the antenna mounts 100, 100' described herein. Thus, properties and/or features of the antenna mount 100" may be described above in reference to FIG. 1 and/or FIGS. 3A-3C, and duplicate discussion thereof may be omitted herein for purposes of discussing FIGS. 5A-5D.

As shown in FIGS. 5A-5D, the antenna mount 100" includes a base plate 102" having a plurality of arm sections 104" with corresponding slots 105" and a plurality of brackets 106" slidably secured to the base plate 102" via fasteners 108". The antenna mount 100" differs from antenna mounts 100, 100' in that the base plate 102" is configured such that a pole top mount 160 may be secured thereto. In some embodiments, the antenna mount 100" may comprise mounting apertures 103" similar to mounting apertures **103*b*' of antenna mount 100'. The mounting apertures 103" may be sized and configured to receive fasteners 124' to secure the pole top mount 160 to the base plate 102". Exemplary pole top mounts 160 that may be used with the antenna mount 100"** described herein are disclosed in U.S. Patent Application Publication No. 2020/0106169 to Ahmed et al and U.S. patent application Ser. No. 16/887,157, the disclosures of which are incorporated by reference herein in their entireties.

Figure 5A:
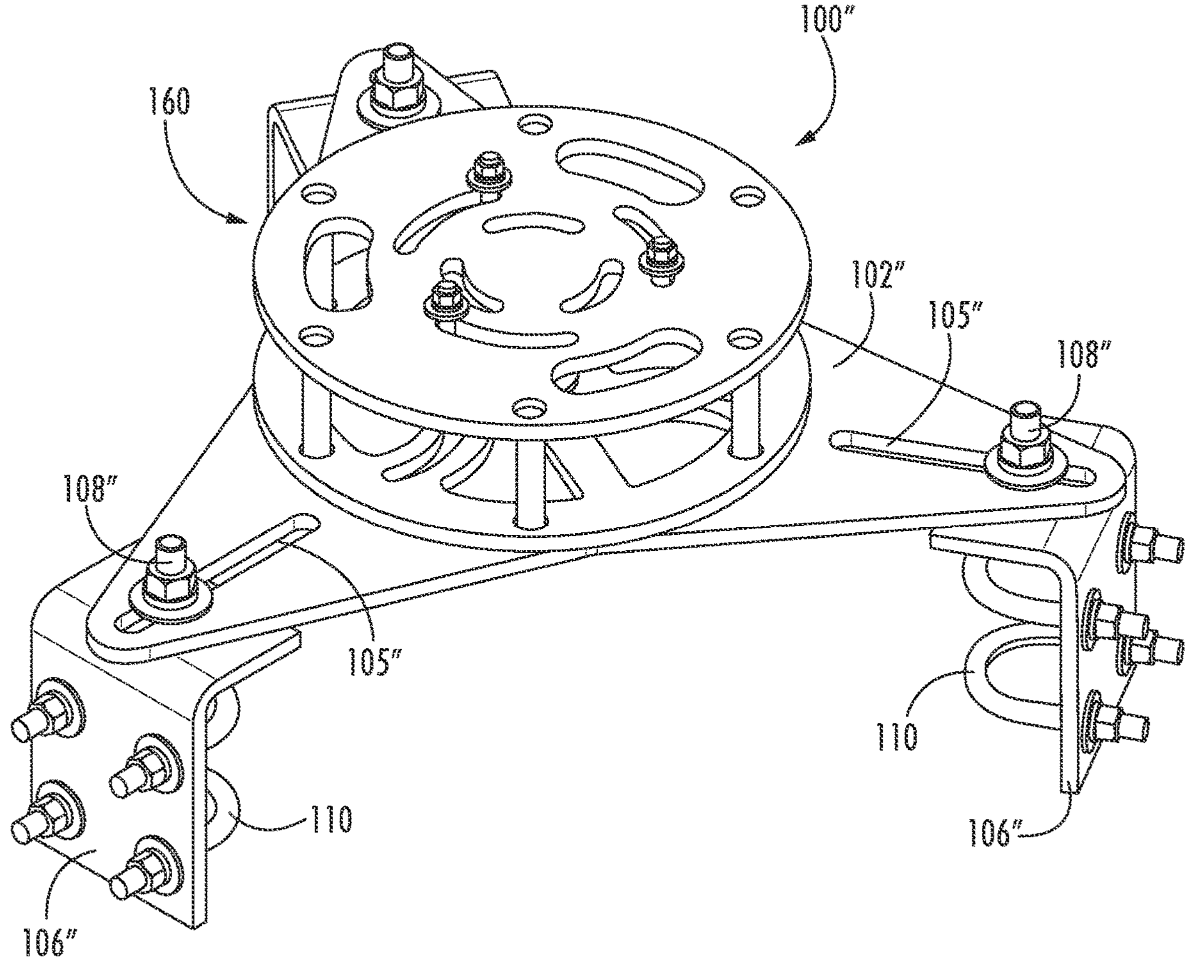
FIG. 5A is a perspective view of an antenna mount according to embodiments of the present invention.
Figure 5B:
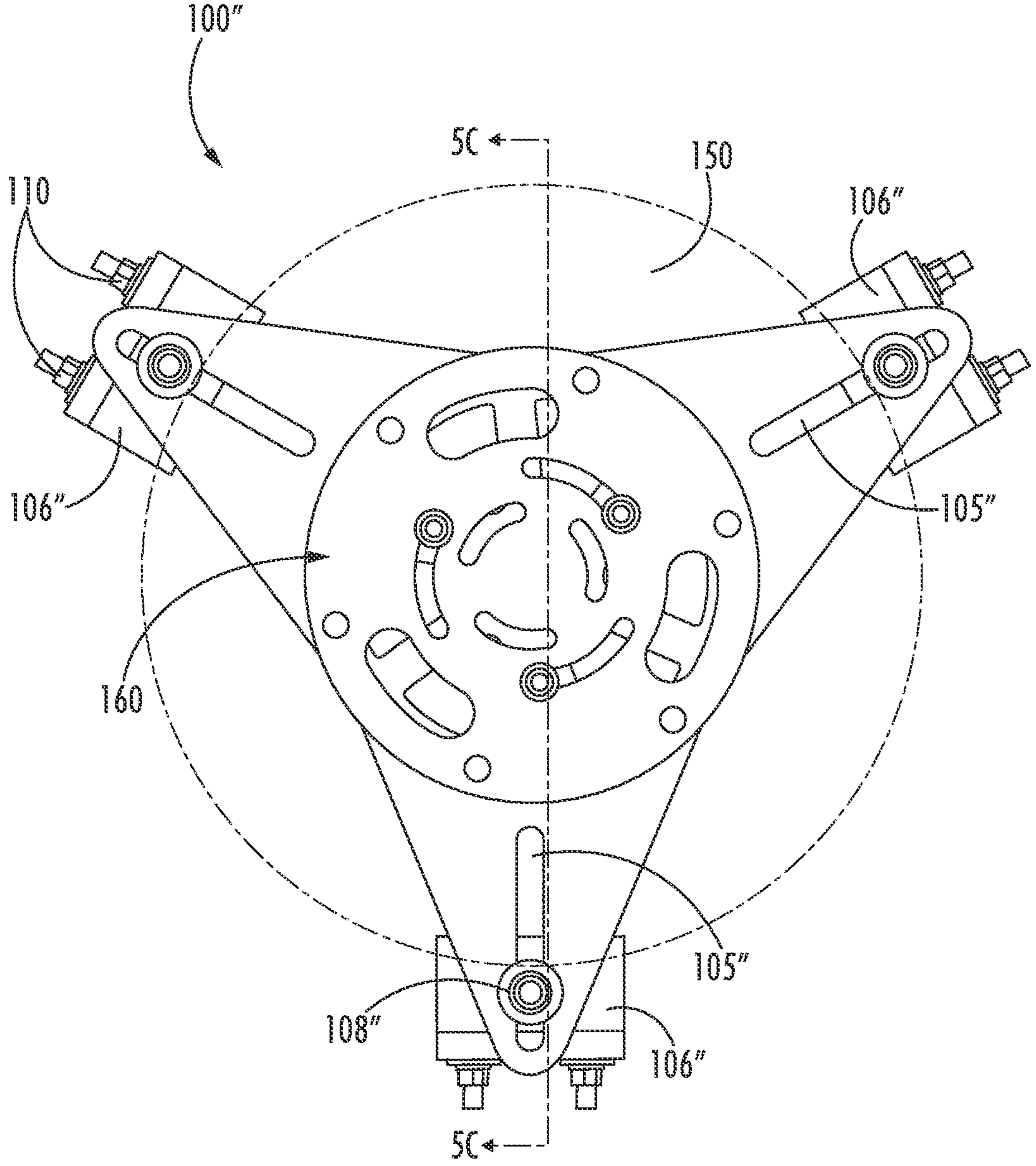
FIG. 5B is a top view of the antenna mount of FIG. 5A.
Figure 5C:
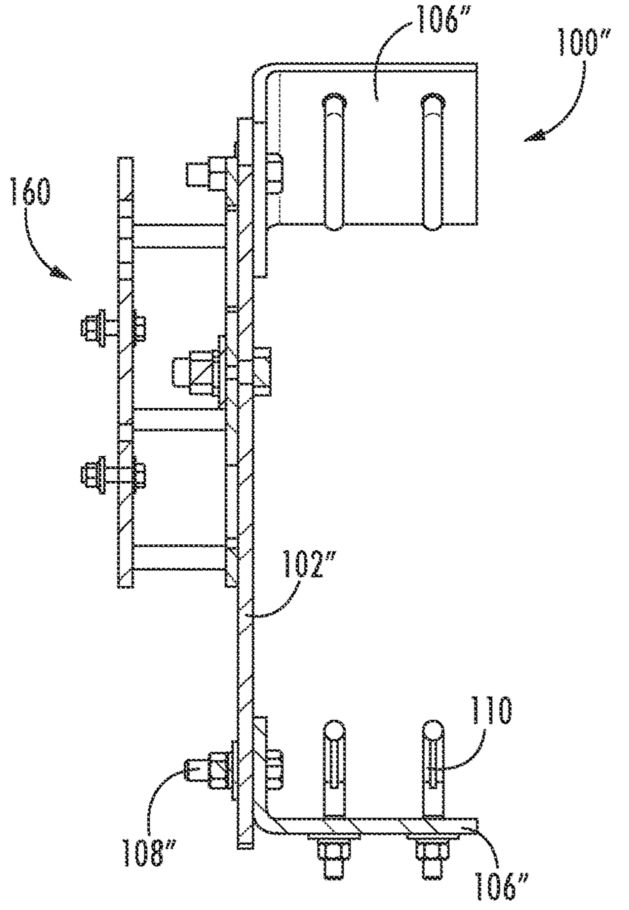
FIG. 5C is a cross-sectional view of the antenna mount of FIG. 5B taken along line 5C-5C.
Figure 5D:
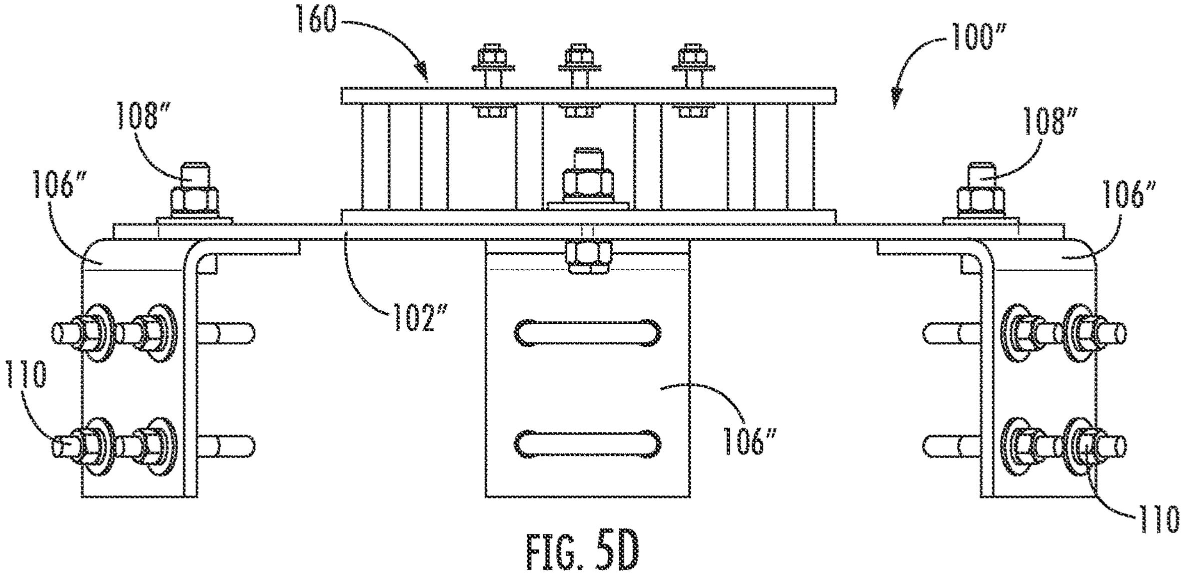
FIG. 5D is a side view of the antenna mount of FIG. 5A.

The antenna mount 100" also may differ from antenna mounts 100, 100' in the length of the slots 105". As shown in FIGS. 5A-5B, the slots 105" of antenna mount 100" may be shorter in length than the slots 105, 105' for antenna mounts 100, 100' (i.e., the slots 105" do not extend as far inward toward the center of the base plate 102" as slots 105, 105'). The shorter slots 105" of antenna mount 100" may allow for the pole top mount 160 to be secured to the base plate 102" without the pole top mount 160 interfering with the sliding action of the fasteners 108" within the slots 105".

Figure 6B:
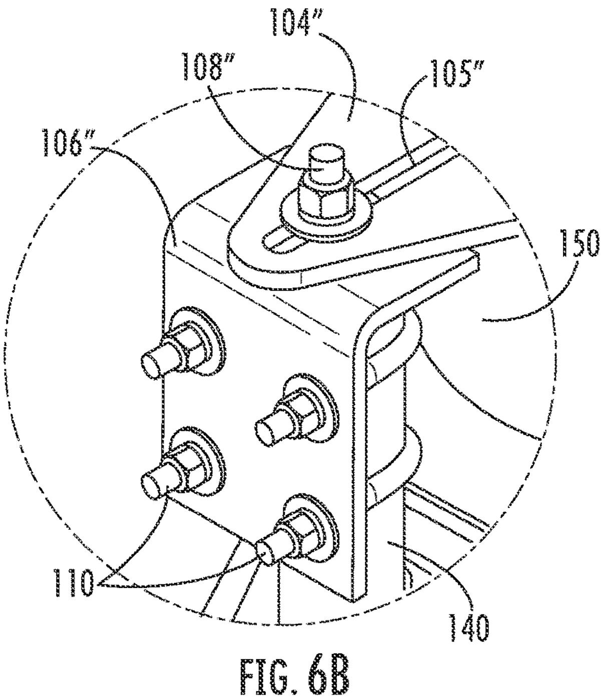
FIG. 6B is an enlarged view of the circled section of the antenna mount assembly of FIG. 6A labeled 6B.
Figure 6C:
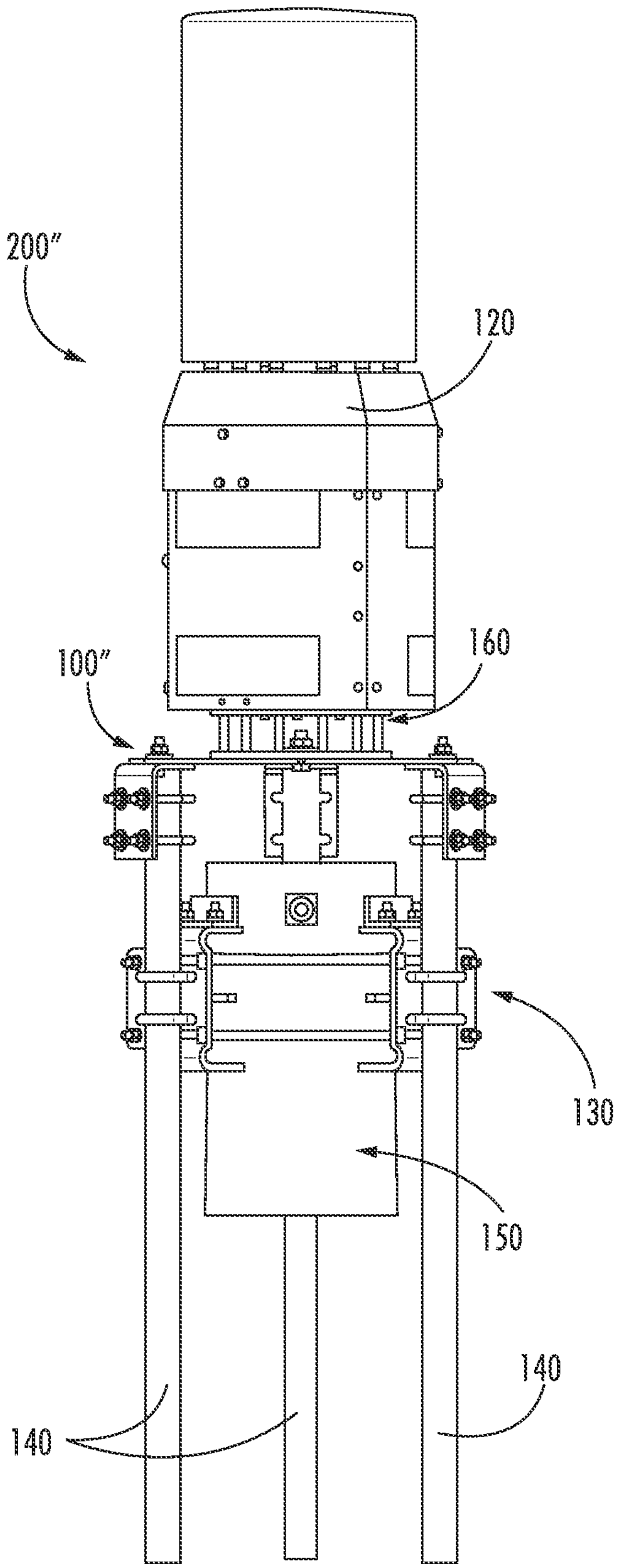
FIG. 6C is a side view of the antenna mount assembly of FIG. 6A.

Referring now to FIGS. 6A-6C, an antenna mount assembly 200" according to embodiments of the present invention and that may utilize the antenna mount 100" described herein is illustrated. As shown in FIGS. 6A-6C, in the antenna mount assembly 200", the antenna mount 100" is secured to a mounting structure 150 (e.g., a utility pole) in the same manner as the antenna mounts 100, 100' described herein (i.e., via mounting poles 140 and a ring mount 130) (see also, e.g., FIGS. 7A-7B). The antenna mount assembly 200" differs from antenna mount assemblies 200, 200' in the manner in which an antenna 120" is secured to the antenna mount 100", i.e., via the pole top mount 160 rather than an antenna mount adapter 122 or antenna mounting fasteners 124, respectively. As shown in FIG. 6C, similar to the antenna mount adapter 122 and antenna mounting fasteners 124, the pole top mount 160 positions and secures the antenna 120" a distance (D') above the base plate 102" of the antenna mount 100", thereby allowing cables (not shown) to be connected to and routed from the bottom of the antenna 120".

The size and/or type of antenna 120, 120', 120" will determine which of the antenna mounts 100, 100', 100" (and antenna mount assemblies 200, 200', 200") should be used. Once secured to a mounting structure 150, in some embodiments, the antenna mounts 100, 100', 100" described herein (and corresponding antenna mount assemblies 200, 200', 200") may be capable of withstanding a wind load of at least 150 mph.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An antenna mount, the mount comprising:

a base plate having a center aperture and a plurality of mounting apertures residing around the center aperture, wherein the base plate includes a plurality of arm sections extending radially outwardly therefrom, each arm section comprising an elongated slot extending radially outwardly relative to the center aperture;

a plurality of fasteners, each fastener configured to slide within a respective slot;

a pole top mount secured to the base plate via the plurality of mounting apertures; and a plurality of L-shaped brackets, each L-shaped bracket secured to the base plate by a respective fastener extending through each slot, wherein the position of the brackets is adjustable relative to the base plate by sliding the fasteners radially within each slot relative to the center aperture in the base plate, thereby allowing the antenna mount to be secured to different diameter mounting structures.

2. The antenna mount according to claim 1, wherein the base plate further comprises a plurality of cable apertures, each cable aperture sized and configured to receive one or more cables connected to the bottom of an antenna.

3. The antenna mount according to claim 1, further comprising a plurality of mounting poles, each mounting pole secured to a respective bracket via one or more mounting fasteners.

4. The antenna mount according to claim 3, further comprising a ring mount secured to the mounting structure, wherein the plurality of mounting poles is configured to be secured to the ring mount.

5. The antenna mount according to claim 4, wherein the mounting structure is a utility pole having a pre-drilled hole pattern, and wherein the ring bracket is adjustable to be secured to any of the one or more pre-drilled holes.

6. The antenna mount according to claim 4, wherein the ring mount comprises an extension bracket configured to receive a through bolt, and wherein the through bolt secures the ring mount to the mounting structure.

7. The antenna mount according to claim 3, further comprising at least one small cell antenna secured to any one of the plurality of mounting poles.

8. The antenna mount according to claim 1, further comprising a small cell antenna mounted to the pole top mount.

9. The antenna mount according to claim 7, wherein the at least one small cell antennas secured to any one of the plurality of mounting poles is a 5G small cell antenna.

10. The antenna mount according to claim 8, wherein the small cell antenna mounted to the pole top mount is a metrocell antenna.

11. The antenna mount according to claim 1, wherein the antenna mount is capable of withstanding a wind load of at least 150 mph.

12. An antenna mount assembly, the assembly comprising:

a mounting structure having a diameter and comprising one or more pre-drilled holes;

a plurality of small cell antennas; and an antenna mount, the antenna mount comprising:

a base plate having a center aperture and a plurality of mounting apertures residing around the center aperture, wherein the base plate includes a plurality of arm sections extending radially outwardly therefrom, each arm section comprising an elongated slot extending radially outwardly relative to the center aperture;

a plurality of fasteners, each fastener configured to slide within a respective slot;

a pole top mount secured to the base plate via the plurality of mounting apertures, wherein at least one of the plurality of small cell antennas is mounted on the pole top mount; and a plurality of brackets, each bracket secured to the base plate by a respective fastener extending through each slot, wherein the position of the brackets is adjustable relative to the base plate by sliding the fasteners radially within each slot relative to the center aperture in the base plate, thereby allowing the antenna mount to be secured to the mounting structure, and wherein the antenna mount assembly is capable of withstanding a wind load of at least 150 mph.

13. The antenna mount assembly according to claim 12, wherein the base plate further comprises a plurality of cable apertures, each cable aperture sized and configured to receive one or more cables connected to the bottom of an antenna.

14. The antenna mount assembly according to claim 12, further comprising a plurality of mounting poles, each mounting pole secured to a respective bracket via one or more mounting fasteners, wherein at least one of the plurality of small cell antennas is mounted to one of the plurality of mounting poles.

15. The antenna mount assembly according to claim 14, further comprising a ring mount secured to the mounting structure, wherein the plurality of mounting poles is configured to be secured to the ring mount.

16. The antenna mount assembly according to claim 15, wherein the mounting structure is a utility pole, and wherein the ring bracket is adjustable to be secured to any of the one or more pre-drilled holes.

17. The antenna mount assembly according to claim 15, wherein the ring mount comprises an extension bracket configured to receive a through bolt, and wherein the through bolt secures the ring mount to the mounting structure.

18. The antenna mount assembly according to claim 14, wherein the at least one small cell antenna secured to the mounting poles is a 5G small cell antenna, and wherein the small cell antenna mounted to the pole top mount is a metrocell antenna.

* * * * *